United States Patent [19]
Smith

[11] Patent Number: 5,622,900
[45] Date of Patent: Apr. 22, 1997

[54] WAFER-LIKE PROCESSING AFTER SAWING DMDS

[75] Inventor: Gregory C. Smith, Garland, Tex.

[73] Assignee: Texas Instruments Incorporated, Dallas, Tex.

[21] Appl. No.: 374,384

[22] Filed: Jan. 12, 1995

Related U.S. Application Data

[63] Continuation of Ser. No. 25,533, Mar. 3, 1993, abandoned.

[51] Int. Cl.$^6$ .................................................. H01L 21/302
[52] U.S. Cl. ............................................ 438/464; 156/268
[58] Field of Search ...................................... 437/226, 227; 148/DIG. 28

[56] References Cited

U.S. PATENT DOCUMENTS

| | | | |
|---|---|---|---|
| 5,061,049 | 10/1991 | Hornbeck | 359/224 |
| 5,083,234 | 1/1992 | Lehto et al. | 361/283 |
| 5,358,590 | 10/1994 | Yamanaka | 437/226 |
| 5,386,142 | 1/1995 | Kurtz et al. | 257/690 |
| 5,459,081 | 10/1995 | Kajita | 437/3 |

FOREIGN PATENT DOCUMENTS

| | | | |
|---|---|---|---|
| 55-078544 | 6/1980 | Japan . | |
| 56-148838 | 11/1981 | Japan . | |
| 0148838 | 11/1981 | Japan | 437/227 |
| 62-069635 | 3/1987 | Japan . | |
| 62-49231 | 3/1987 | Japan . | |
| 63-62267 | 3/1988 | Japan . | |
| 0094656 | 4/1988 | Japan | 437/227 |
| 3228350 | 10/1991 | Japan . | |
| 1271128 | 4/1972 | United Kingdom | 437/228 |

Primary Examiner—R. Bruce Breneman
Assistant Examiner—Ramamohan Rao
Attorney, Agent, or Firm—James C. Kesterson; Charles A. Brill; Richard L. Donaldson

[57] ABSTRACT

A method of fabricating debris intolerant devices 30, and especially micro-mechanical devices such as DMDs, that allows wafers 22 to be sawn prior to completing all fabrication steps. Some devices are too fragile to allow cleaning operations to be performed after fabrication of the device. A solution is to saw and clean the wafers prior to completing the fabrication steps that make the device fragile. To prevent having to process the chips 30 individually, a substrate wafer 28 is attached to the backside of the dicing tape 24. This substrate wafer holds the sawn chips 30 in alignment allowing the remaining fabrication steps to be performed in wafer form.

19 Claims, 1 Drawing Sheet

WAFER-LIKE PROCESSING AFTER SAWING DMDS

This application is a Continuation of application Ser. No. 08/025,533, filed Mar. 3, 1993, abandoned.

1. Field of the Invention

This invention relates to the field of integrated circuit processing, more particularly to micro-mechanical device fabrication, including digital micro-mirror devices.

2. Background of the Invention

In order for integrated circuit (IC) processing to be cost effective, the individual devices, or chips, must be mass produced by using a semiconductor wafer to make many chips on a single substrate simultaneously. This reduces the handling necessary because processing equipment must only move and align one wafer instead of many chips. Alignment, or registration, is very critical for several steps in the IC fabrication process including lithography and die testing. After all wafer level processing has been done, the chips are cut or broken apart and packaged. When the devices are cut from a wafer, wafer particles and dust, also known as dicing debris, are created. This dicing debris is then washed from the surface of the IC prior to bonding the chip to the package.

Micro-mechanical devices often have structures that are too fragile to survive exposure to some of the standard IC fabrication steps. An example is the digital micro-mirror device (DMD). DMDs are explained in commonly assigned U.S. Pat. No. 5,061,049. As described in the aforementioned patent, DMDs have a very small mirror suspended over an air gap above electrodes formed on the surface of a silicon substrate. Once this mirror is formed and the sacrificial material etched from the air gap, the DMD is very fragile. The devices cannot be washed without destroying the mirror. Therefore, the devices must be cut and the dicing debris washed away before etching the sacrificial material away from the mirror. This requires that the cleaning and etching steps, and any following steps including passivation and testing, be performed on the individual chips instead of a wafer.

SUMMARY OF THE INVENTION

It is an object of the invention to provide a method for efficient processing of debris intolerant devices in wafer form. This is done by temporarily bonding a substrate wafer to the back of a membrane supporting the device wafer. The substrate wafer holds the diced chips together as a wafer until wafer processing steps are complete. Wafer processing simplifies handling during fabrication and allows the production flow to more closely follow that of a standard integrated circuit. Standard wafer processing techniques allow cost effective production of devices in quantity as opposed to the expensive methods of fabricating devices individually.

DETAILED DESCRIPTION OF THE PREFERRED EMBODIMENTS

Figure 1:
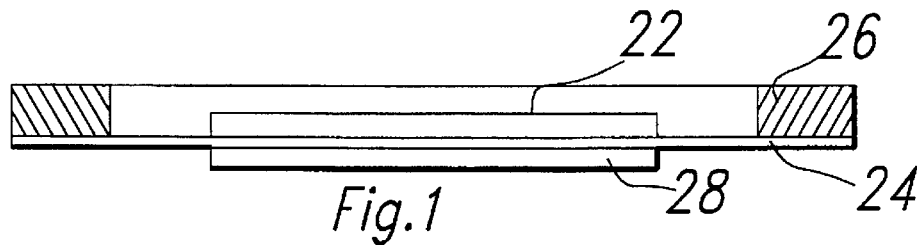
FIG. 1 is a sectional view of a semiconductor wafer and substrate wafer on a dicing tape ring prior to dicing.

FIG. 1 shows one embodiment of the present invention. A device wafer 22, is bonded to a membrane, normally a piece of dicing tape 24, which is mounted in an aluminum ring 26. A substrate wafer 28 is bonded to the back of the dicing tape. The substrate wafer 28 could be made of any material that is rigid enough to keep the sawn chips aligned with each other. The material must be thin enough and light-weight enough to allow the processing equipment to handle the supported device wafer 22. In one embodiment of the invention a silicon substrate wafer is used. Another embodiment requires that the substrate wafer 28 be a material, such as quartz, that is transparent to ultra-violet (UV) light. A metal substrate wafer could also be used.

Depending on the device being fabricated and the steps necessary to create that device, a protective layer may be required during the saw operation. This could be an oxide layer, a spun-on photoresist layer, or any other substance that will protect the device from the sawing operation, dicing debris, and cleanup procedures. In the case of DMD fabrication, a thin oxide layer is grown, followed by a spun-on layer of photoresist to prevent scratching the mirrors during the following saw operation.

Figure 2:
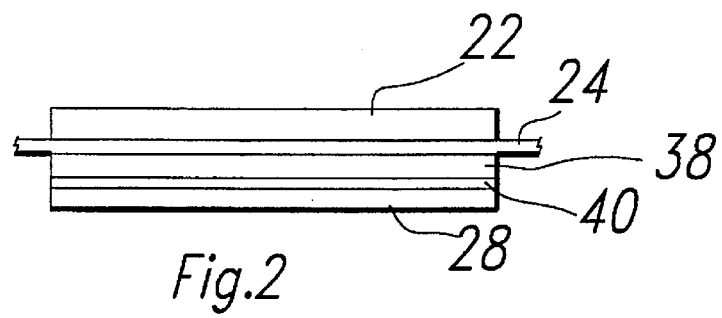
FIG. 2 is a sectional view of a semiconductor wafer and substrate wafer showing an alternate mounting method.

The substrate may be mounted on the dicing tape 24 either by using a double-sided dicing tape, using adhesive, or by heating the substrate wafer to over 70° C. and pressing it against the back side of the dicing tape 24. An alternate method of attaching the substrate wafer 28 is shown in FIG. 2. A piece of UV release tape 38 is attached to the back of dicing tape 24 which is attached to device wafer 22. The UV tape 38 could be double-sided tape or could have adhesive 40 spun onto the backside. The substrate wafer 28 is then attached to the backside of the UV tape 38. The UV release tape 38 allows the tape and substrate wafer 28 to easily be removed from the dicing tape 24 after processing.

Figure 3:
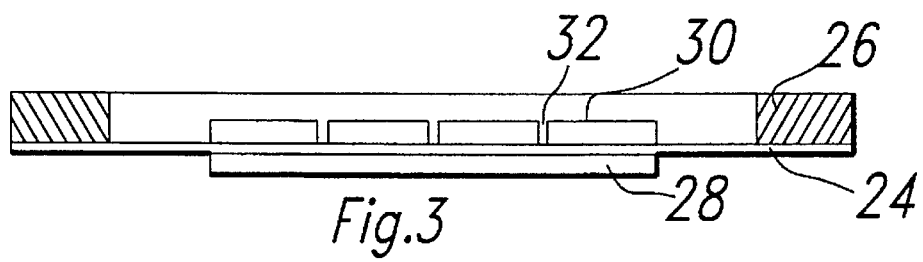
FIG. 3 is a sectional view of a semiconductor wafer and substrate wafer on a dicing tape ring after dicing.

After mounting the device wafer 22 and the substrate wafer 28 to the dicing tape 24, the device wafer 22 is sawed into discrete chips 30. As shown in FIG. 3, the saw kerfs should extend completely through the device wafer 22 but should not extend through the dicing tape 24.

While FIG. 1 showed the preferred method of mounting the substrate wafer 28 on the dicing tape 24 prior to the sawing operation, this method sometimes creates air bubbles between the dicing tape 24 and the substrate wafer 28. The air bubbles can cause either the saw or device wafer 22 to break during the saw operation. An alternate method is to saw the device wafer 22 prior to mounting the substrate wafer 28. The alternate method has the advantage of eliminating the breakage caused by air bubbles. The disadvantage is that it is more likely some of the chips 30 will become misaligned either during the saw operation or when the substrate wafer 28 is mounted on the stretchable dicing tape 24.

Figure 4:
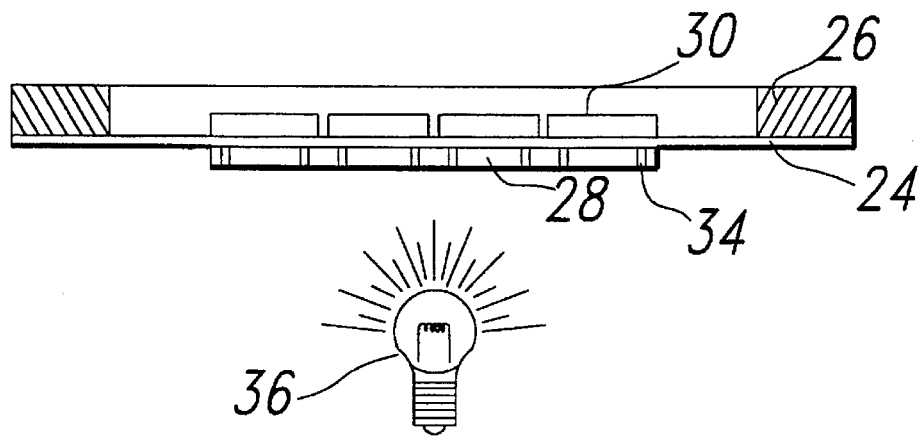
FIG. 4 is a sectional view of a dicing tape being illuminated with ultra-violet light to facilitate removal of the chips.

After all wafer processing is completed, the chips 30 are removed from the dicing tape 24 and placed in the desired packages. Chips 30 may be taken directly from the dicing tape 24 with the substrate wafer 28 attached. It is preferable to remove the substrate wafer 28 to allow existing pick-and-place machinery access to the chips 30. The adhesive holding the chips 30 to the dicing tape 24 may need to be weakened in order to remove the chips 30. One method of weakening the adhesive is to use a UV transparent material, such as quartz, for the substrate wafer 28. As shown in FIG. 4, a light source 36, in this case emitting UV light, illuminates the dicing tape 24 through the backside of the substrate wafer 28. This weakens the adhesive and allows the completed chips 30 to be easily removed from the dicing tape 24.

An alternative method of allowing access to the completed chips 30 is to drill holes 34 through the substrate wafer 28 as shown in FIG. 4. These holes allow the fingers of the pick-and-place machinery access to the dicing tape 24 and completed chips 30. The fingers protrude through the holes and lift the completed chips 30 from the dicing tape 24.

Thus, although there has been described to this point a particular embodiment for a method of debris intolerant micro-mechanical device fabrication allowing wafer processing after dicing, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method for fabricating a device comprising:

attaching a device wafer containing two or more said devices to a front side of a membrane, wherein said devices have an initial relative alignment;

attaching a substrate wafer to a back side of said membrane; and separating said devices by sawing or breaking said device wafer, wherein said substrate wafer rigidly maintains said initial relative alignment during and after said separating process.

2. The method of claim 1 wherein said membrane is a tape having an adhesive on each side.

3. The method of claim 1 wherein said membrane is a tape having an adhesive only on the front side and said substrate wafer is attached to the back of said membrane by heating said substrate wafer and pressing said substrate wafer against the back of said tape, said device wafer attached to the front side of said tape.

4. The method of claim 1 wherein said membrane is a tape having an adhesive only on the front side, said attaching step further comprising using an additional adhesive to attach said substrate wafer to the back of said tape, said device wafer attached to the front side of said tape.

5. The method of claim 1 wherein said substrate wafer is silicon.

6. The method of claim 1 wherein said substrate wafer is quartz.

7. The method of claim 1 wherein said substrate wafer is metal.

8. The method of claim 1 wherein said substrate wafer contains holes fabricated to allow access to the devices.

9. The method of claim 1, wherein an adhesive is used to attach said substrate wafer, further comprising the step of exposing said adhesive to ultra-violet light to reduce the adhesion of said adhesive, thereby facilitating the removal of said substrate wafer.

10. A method for fabricating a debris intolerant device comprising:

attaching a device wafer containing two or more said devices to a front side of a membrane, wherein said devices have an initial relative alignment;

separating the devices by sawing or breaking said device wafer; and attaching a substrate wafer to a back side of said membrane after said separating step, wherein said substrate wafer rigidly maintains said initial relative alignment.

11. The method of claim 10 wherein said membrane is a tape having adhesive on each side.

12. The method of claim 10 wherein said membrane is a tape having adhesive only on the front side, and wherein said substrate wafer is attached to the back of said membrane by heating said substrate wafer and pressing said substrate wafer against the back of said membrane, said device wafer attached to the front side of said membrane.

13. The method of claim 10 wherein said membrane is a tape having an adhesive on the front side, said substrate wafer attached to the back of said membrane by an additional adhesive.

14. The method of claim 10 wherein said substrate wafer is silicon.

15. The method of claim 10 wherein said substrate wafer is quartz.

16. The method of claim 10 wherein said substrate wafer is metal.

17. The method of claim 10 wherein said substrate wafer contains holes fabricated to allow access to the devices.

18. The method of claim 10, wherein an adhesive is used to attach said substrate wafer to said membrane, further comprising the step of exposing said adhesive to light to reduce the adhesion of said adhesive thereby facilitating the removal of said substrate wafer from said membrane.

19. The method of bonding a substrate wafer to the back of dicing tape having adhesive only on a front side, said method comprising:

heating said substrate wafer; and pressing said heated substrate wafer against the back side of said dicing tape.

* * * * *